(12) United States Patent
Sung

(10) Patent No.: US 10,272,823 B2
(45) Date of Patent: Apr. 30, 2019

(54) VEHICLE HEADLAMP SYSTEM AND METHOD OF CONTROLLING THE SAME

(71) Applicant: HYUNDAI MOBIS Co., Ltd., Seoul (KR)

(72) Inventor: Jun Young Sung, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 15/965,091

(22) Filed: Apr. 27, 2018

(65) Prior Publication Data

US 2018/0354408 A1 Dec. 13, 2018

(30) Foreign Application Priority Data

Jun. 8, 2017 (KR) .......................... 10-2017-0071495

(51) Int. Cl.
*B60Q 1/14* (2006.01)
(52) U.S. Cl.
CPC ...... *B60Q 1/1423* (2013.01); *B60Q 2300/056* (2013.01); *B60Q 2300/41* (2013.01)
(58) Field of Classification Search
CPC .............. B60Q 1/1423; B60Q 2300/41; B60Q 2300/056; B60Q 2300/23; B60Q 2300/14; B60Q 2300/45
See application file for complete search history.

(56) References Cited

U.S. PATENT DOCUMENTS

| 9,789,808 | B1* | 10/2017 | Hong | B60Q 1/085 |
| 2004/0052083 | A1* | 3/2004 | Daicho | B60Q 1/085 362/466 |
| 2005/0134483 | A1* | 6/2005 | Monji | B60Q 1/085 340/933 |
| 2006/0267502 | A1* | 11/2006 | Kubota | B60Q 1/143 315/82 |
| 2013/0293395 | A1* | 11/2013 | Ohama | G08G 1/16 340/904 |
| 2014/0177243 | A1* | 6/2014 | Noh | B60Q 1/143 362/466 |
| 2015/0149045 | A1* | 5/2015 | Mizuno | B60Q 1/1423 701/49 |
| 2016/0236611 | A1* | 8/2016 | Langkabel | B60Q 1/143 |
| 2017/0088036 | A1* | 3/2017 | Roeckl | B60Q 1/085 |
| 2017/0162042 | A1* | 6/2017 | Dooley | G08G 1/167 |
| 2017/0182931 | A1* | 6/2017 | Son | B60Q 1/1423 |
| 2017/0197540 | A1* | 7/2017 | Hibino | B60Q 1/0023 |

\* cited by examiner

*Primary Examiner* — Alexander H Taningco
*Assistant Examiner* — Renan Luque
(74) *Attorney, Agent, or Firm* — Knobbe Martens Olson & Bear LLP

(57) ABSTRACT

A vehicle headlamp system providing a glare-free high beam. A forward image-capturing device captures a forward image ahead of a vehicle on which the headlamp system is disposed. A blind spot sensor detects blind spots to side and rear of the vehicle. A headlamp lights ahead of the vehicle based on a set illumination area. An electronic control unit (ECU) generates a control command for controlling an illumination area of the headlamp, based on the forward image captured using the forward image-capturing device and information regarding the blind spots detected by the blind spot sensor. A driving unit drives the headlamp based on the control command from the ECU.

3 Claims, 4 Drawing Sheets

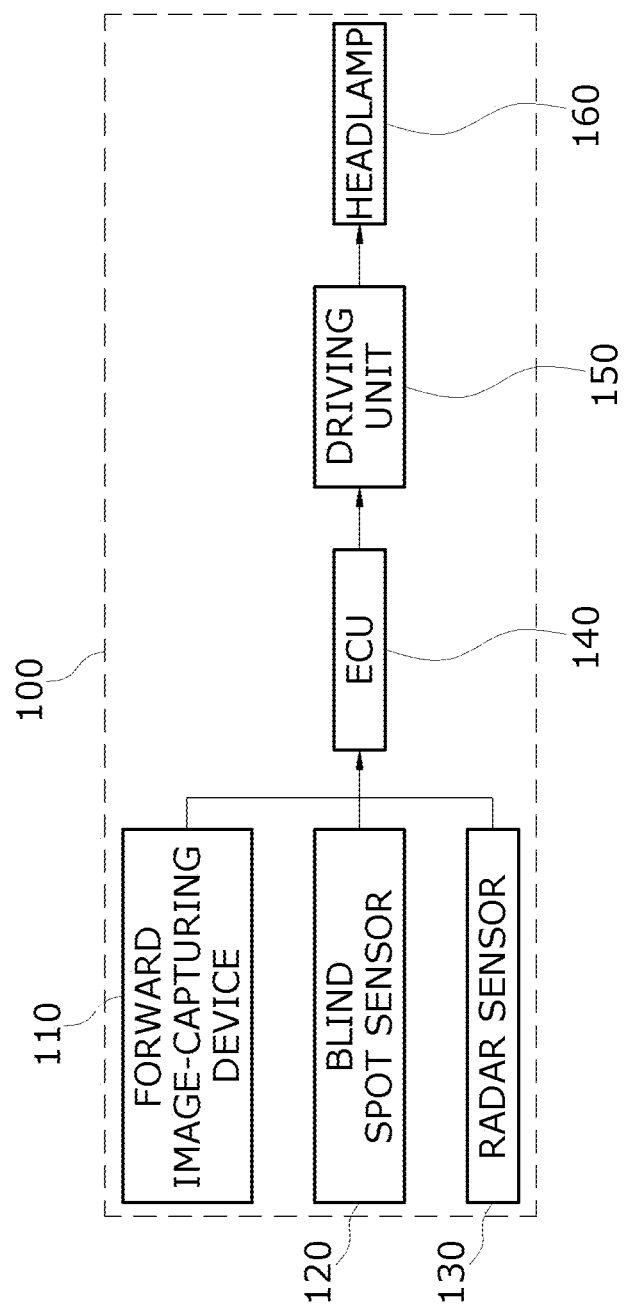

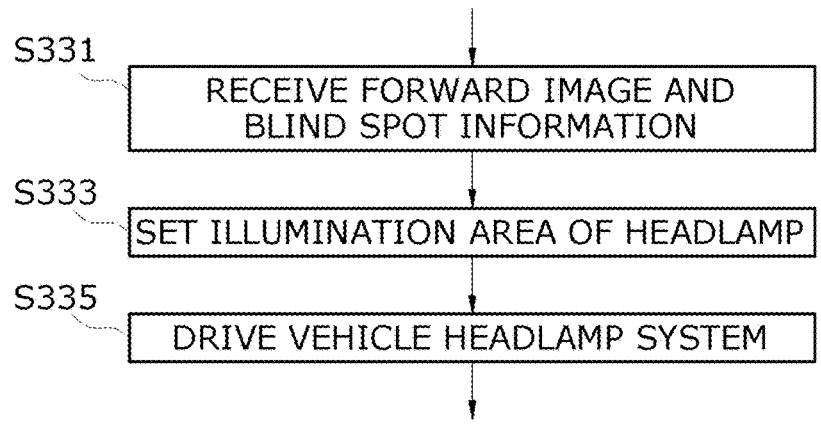
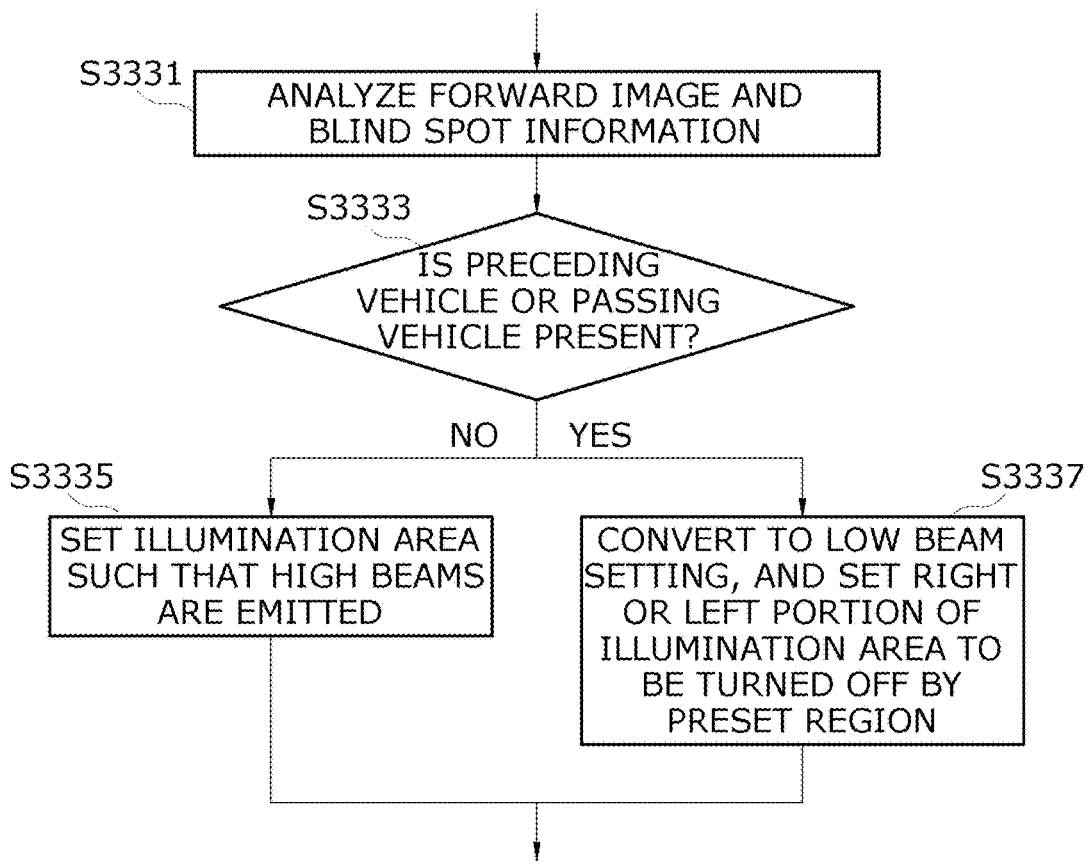

VEHICLE HEADLAMP SYSTEM AND METHOD OF CONTROLLING THE SAME

CROSS REFERENCE TO RELATED APPLICATION

The present application claims priority from Korean Patent Application Number 10-2017-0071495 filed on Jun. 8, 2017, the entire contents of which are incorporated herein for all purposes by this reference.

BACKGROUND

Field

The present disclosure relates, in general, to a vehicle headlamp system and a method of controlling the same, and more particularly, to a vehicle headlamp system providing glare-free high beams, and a method of controlling the same.

Description

In general, headlamps disposed in a vehicle are intended to provide forward illumination to a driver. Headlamps are designed to selectively operate to emit light in a low beam setting or in a high beam setting.

A low beam setting is mainly used when an oncoming vehicle is in the opposite lane in order not to obstruct the view of an oncoming driver, while a high beam setting is used to provide a clearer forward view to a driver when no oncoming vehicle is present in the opposite lane.

When a driver manually alternates a low beam setting and a high beam setting while driving a vehicle, it may be difficult for the driver to safely drive the vehicle. To prevent this problem, glare-free high beam technology has been developed to constantly provide high beams without glare to a driver in an oncoming vehicle in the opposite lane or a driver in a preceding vehicle. Such glare-free high beam technology includes high beam assistance (HBA) technology and adaptive driving beam (ADB) technology, which are key solutions for intelligent headlamps.

To realize glare-free high beam technology, a glare-free area (GFA) for oncoming and preceding vehicles must be accurately defined. However, regarding the characteristics of camera image processing, based on head and rear light sources within an angle of view during night driving, it may be difficult to prevent glare to a vehicle appearing from an area outside of the angle of view.

FIG. 1 is an image illustrating a case in which a passing vehicle is present.

Currently, HBA and ADB, i.e. key solutions for intelligent headlamps, are driven using an image processing algorithm by obtaining an image captured using a forward-facing camera. However, vehicle recognition principles of such solutions are based on the recognition of head and rear light sources during night driving.

In this case, as illustrated in FIG. 1, when a preceding vehicle P1 is present to the side and rear, the body of the preceding vehicle P1 is initially exposed and then rear light sources are exposed. Consequently, regardless of the response speed, it is impossible to prevent glare to a vehicle in front or an oncoming vehicle using a camera sensor, which is problematic.

In addition, in accordance with luminous distribution regulations as represented in the following table, it is required to accurately form a glare-free area (GFA) for glare-free high beam technology. However, in the case of depending on the forward-facing camera, a beam may temporarily glare to oncoming and preceding drivers in a corresponding area, in accordance with the characteristics of the system depending on position information transmitted by the camera.

TABLE

| Test Point | Position/deg. Horizontal | Position/deg. Vertical | Max. Intensity (cd) | Max. Intensity (lx) |
|---|---|---|---|---|
| Line 1 Oncoming Vehicle at 50 m | 4.8° L to 2° L | 0.57° Up | 440 | 0.7 |
| Line 2 Oncoming Vehicle at 100 m | 2.4° L to 1° L | 0.3° Up | 1300 | 2.0 |
| Line 3 Oncoming Vehicle at 200 m | 1.2° L to 0.5° L | 0.14° Up | 3800 | 6.0 |
| Line 4 Preceding Vehicle at 50 m | 1.7° L to 1.7° L | 0.3° Up | 1320 | 2.1 |
| Line 5 Preceding Vehicle at 100 m | 0.9° L to 0.9° L | 0.14° Up | 3900 | 6.2 |
| Line 6 Preceding Vehicle at 200 m | 0.45° L to 0.45° L | 0.1° Up | 11400 | 18 |

In this case, luminous intensity is about 10 lux at 100 m to the front, which is about 20 times a legal reference level for glare, i.e. 0.5 lux.

Accordingly, a solution for controlling headlamps by predicting a vehicle appearing from an area outside of the angle of view of a driver's vehicle is demanded in order to prevent glare to the appearing vehicle.

BRIEF SUMMARY

Various aspects of the present disclosure provide a vehicle headlamp system able to control headlamps of a vehicle on which the headlamp system is disposed, using information obtained by detecting blind spots of the vehicle, thereby preventing glare to a preceding vehicle or an oncoming vehicle, and a method of controlling the same.

The object of the present disclosure is not limited to the aforementioned description, and other objects not explicitly disclosed herein will be clearly understood by a person skilled in the art from the description provided hereinafter.

According to an aspect, provided is a vehicle headlamp system providing a glare-free high beam. The vehicle headlamp system may include: a forward image-capturing device capturing a forward image ahead of a vehicle on which the headlamp system is disposed; a blind spot sensor detecting blind spots to side and rear of the vehicle; a headlamp lighting ahead of the vehicle based on a set illumination area; an electronic control unit (ECU) generating a control command for controlling an illumination area of the headlamp, based on the forward image captured using the forward image-capturing device and information regarding the blind spots detected by the blind spot sensor; and a driving unit driving the headlamp based on the control command from the ECU The headlamp may be an adaptive driving beam (ADB) headlamp configured to emit a high beam or a low beam, depending on the set illumination area.

When neither a preceding vehicle nor a passing vehicle is determined to be present according to a result of analyzing the forward image and the information regarding the blind spots, the ECU may transfer a control command for directing a high beam to be emitted to the driving unit.

The vehicle headlamp system may further include a radar sensor detecting an object ahead of the vehicle. In a case in which a preceding vehicle is present, the ECU may transfer the control command for directing the high beam to be emitted to the driving unit when the preceding vehicle is determined to be present based on radar information obtained using the radar sensor but not to be present in the forward image.

The ECU may transfer a control command to the driving unit, the control command directing the high beam, currently being emitted, to be converted into a low beam, when a right or left passing vehicle is present according to a result of analyzing the forward image and the information regarding the detected blind spots.

The ECU may transfer a control command for directing a portion of the headlamp to be turned off to the driving unit so that a right or left portion of the illumination area, corresponding to the passing vehicle, is reduced.

According to another aspect, provided is a method of controlling a vehicle headlamp system providing a glare-free high beam. The method may include: receiving a forward image captured using a camera and information regarding blind spots sensed using a blind spot sensor; setting an illumination area of a headlamp, based on the forward image and the information regarding the blind spots; and driving the headlamp by transferring a control command for controlling an illumination area of the headlamp thereto, wherein the headlamp is an ADB headlamp.

The step of setting the illumination area may include: analyzing the forward image and the information regarding the sensed blind spots; and when a right or left passing vehicle is determined to be present according to a result of the analysis, setting the illumination area such that a high beam, currently being emitted, is converted into a low beam.

The step of setting the illumination area may cause a right or left portion of the headlamp to be turned off so that a right or left portion of the illumination area, corresponding to the passing vehicle, is reduced.

According to at least one of exemplary embodiments, the headlamp system can be applied as a vehicle headlamp system, which is currently used in a mass production vehicle model, without an increase in fabrication costs. Even in the case in which a passing vehicle is present, glare to a preceding vehicle or an oncoming vehicle can be prevented.

BRIEF DESCRIPTION OF THE DRAWINGS

FIG. 2 is a block diagram illustrating a vehicle headlamp system according to exemplary embodiments; and FIGS. 3A to 3C are flow charts illustrating a control method according to exemplary embodiments.

DETAILED DESCRIPTION

Figure 1:
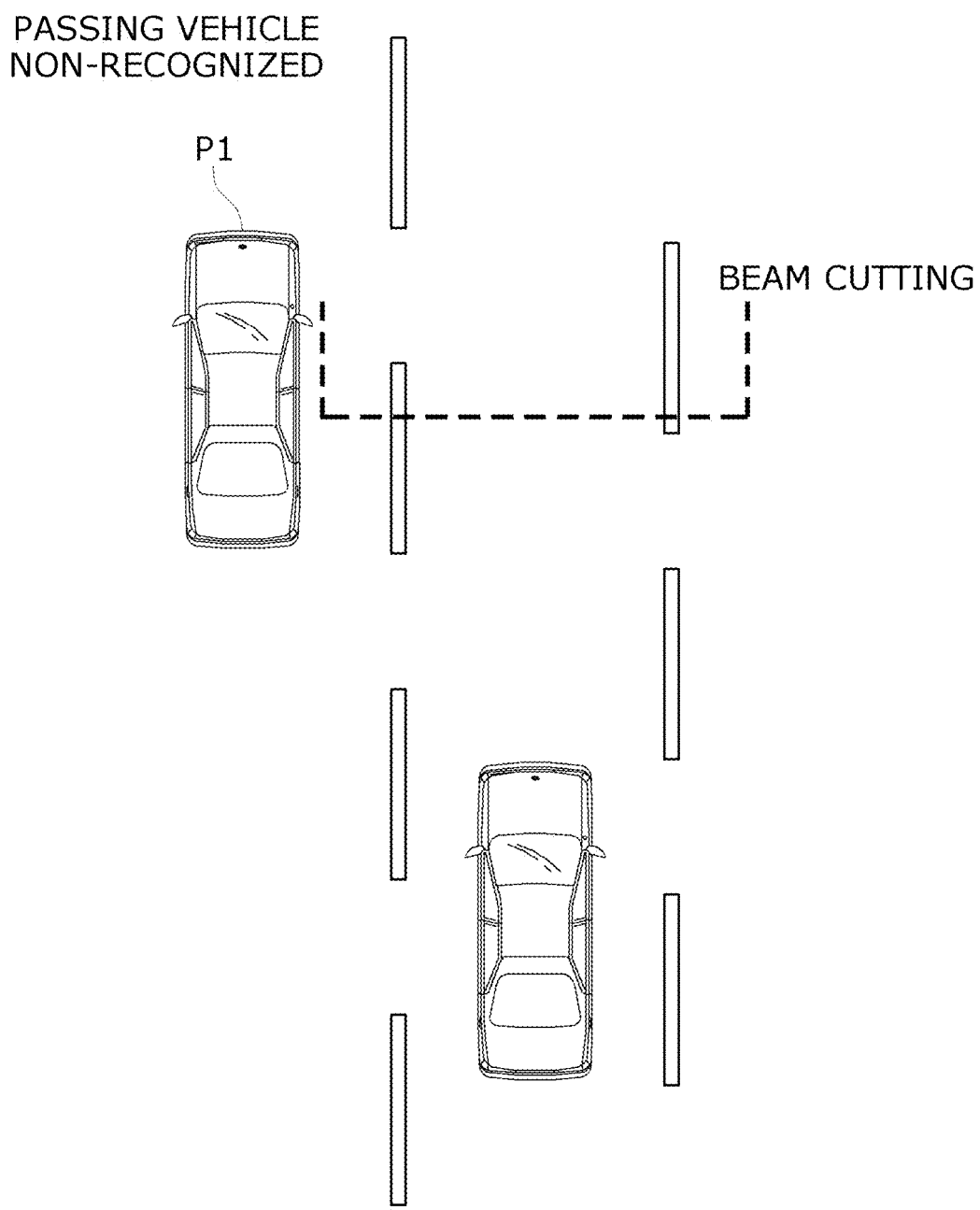
FIG. 1 is an image illustrating a case in which a passing vehicle is present.

Hereinafter, exemplary embodiments of the present disclosure will be described in detail with reference to the accompanying drawings, so that a person skilled in the art to which the present disclosure relates could easily put the present disclosure into practice. The present disclosure should not be construed as being limited to these embodiments and may be embodied in many different forms. In the drawings, those parts that are not essential to the description are omitted to make the present disclosure clear.

The terms "comprise," "include," "have," and any variations thereof used throughout the specification and the appended Claims are intended to cover a non-exclusive inclusion unless explicitly described to the contrary.

Hereinafter, exemplary embodiments of the present disclosure will be described in detail with reference to the accompanying drawings.

FIG. 2 is a block diagram illustrating a vehicle headlamp system 100 according to exemplary embodiments.

The vehicle headlamp system 100 according to exemplary embodiments includes a forward image-capturing device 110, a blind spot sensor 120, headlamps 160, an electronic control unit (ECU) 140, and a driving unit 150.

The forward image-capturing device 110 includes a camera to capture an image or a forward image ahead of a vehicle in which the vehicle headlamp system 100 is provided.

The blind spot sensor 120 is a blind spot detection (BSD) sensor detecting blind spots to the side and rear of the vehicle.

The headlamps 160 light the road ahead, based on an illumination area set by the ECU 140. The headlamps 160 may be adaptive driving beam (ADB) headlamps, i.e. lighting devices respectively providing a beam by adjusting the angle, brightness, width, length, and like, of illumination thereof. The headlamps 160 can emit light in a high beam setting or a low beam setting, or emit high beams or low beams, depending on the illumination area set by the ECU 140.

The ECU 410 generates a control command for controlling the illumination area of the headlamps 160, based on the forward image captured using the forward image-capturing device 110 and information regarding blind spots detected by the blind spot sensor 120, and transfers the control command to the driving unit 150.

The driving unit 150 receives the control command from the ECU 140 and drives the headlamps 160 based on the control command. For example, the driving unit 150 may be provided with an actuator including a motor. The driving unit 150 may drive the headlamps 160 using the actuator so that the headlamps 160 are adjusted upward to a high beam setting to emit high beams or are adjusted downward to a low beam setting to emit low beams.

Specifically, the ECU 140 determines whether or not a preceding vehicle or a passing vehicle is present by analyzing the forward image and information regarding blind spots.

When neither a preceding vehicle nor a passing vehicle is determined to be present, the ECU 140 can generate a control command and transfer the control command to the driving unit 150, the control command directing the headlamps 160 to emit high beams.

Here, the vehicle headlamp system 100 according to exemplary embodiments may further include a radar sensor 130.

The radar sensor 130 captures a radar image ahead of the vehicle using radio waves. The radar sensor 130 includes a transmitter transmitting radio waves and a receiver receiving radio waves reflected from an object ahead.

According to the above described configuration, when a preceding vehicle is determined to be present in information obtained using the radar sensor 130 (hereinafter referred to as "radar information) but not in the forward image, the ECU 140 may generate a control command and transfer the control command to the driving unit 150, the control command directing high beams to be emitted.

In addition, when a preceding vehicle is determined to be present in the forward image but not in the radar information, the ECU 140 may generate a control command and transfer the control command to the driving unit 150, the control command directing low beams to be emitted.

When at least one preceding vehicle is determined to be present in both the forward image and the radar information, the ECU 140 may control low beams to be emitted.

As described above, when a preceding vehicle is detected using a radar having a long sensing distance but is not detected in a forward image, high beams are emitted for the convenience of a driver. When the preceding vehicle is also detected in a forward image as being closer, low beams may be emitted to lower the possibility of an accident.

That is, radar information can be used as supplement to a forward image. When a preceding vehicle is only detected in the radar information, the ECU 140 can recognize that the preceding vehicle is getting closer. In this case, the ECU 140 can capture a forward image by further shortening an image capturing period or further accelerating a rate at which a captured forward image is analyzed so that the forward image can be more accurately analyzed. Consequently, the ability to detect the preceding vehicle can be improved.

In addition, when a right or left passing vehicle is determined to be present according to the result of analyzing a forward image and information regarding blind spots, the CUE 140 can generate a control command and transfer the control command to the driving unit 150, the control command directing a high beam setting, in which high beams are being currently emitted, to be converted into a low beam setting.

Here, the ECU 140 can generate a control command for directing the entirety or a portion of the headlamps 160 to be turned off and transfer the control command to the driving unit 150, so that a right or left portion of an illumination area, corresponding to a passing vehicle, is reduced.

For example, when a following vehicle is determined to be passing ahead along the left side from the vehicle provided with the headlamp system 100, the ECU 140 can convert a high beam setting into a low beam setting while providing an L-shaped beam pattern by adjusting the angle, brightness, width, length, and the like, of illumination of at least one headlamp for an illumination area corresponding to the left side from the vehicle provided with the headlamp system 100, thereby forming a dark zone to the left side. This can consequently prevent glare to the passing vehicle.

After the passing vehicle passed away, the ECU 140 can generate a control command to convert the beam setting to emit high beams.

For reference, the constitutional components according to exemplary embodiments, illustrated in FIG. 2, may be provided as software or hardware components, such as a field programmable gate array (FPGA) or an application-specific integrated circuit (ASIC), to perform specific functions.

However, the constitutional components are not limited to software or hardware, but the respective constitutional components may be configured to reside in an addressable storage medium or may be configured to run on one or more processors.

For example, the constitutional components may include software components, object-oriented software components, class components, task components, processes, functions, factors, procedures, subroutines, program code segments, drivers, firmware, micro-codes, circuits, data, database, data structures, tables, arrays, and variables.

The constitutional components, as well as functions provided by the corresponding constitutional components, may be combined to form a smaller number of constitutional components or may be further divided into additional components.

Hereinafter, a method of controlling the vehicle headlamp system 100 according to exemplary embodiments will be described with reference to FIGS. 3A to 3C.

Figure 3A:
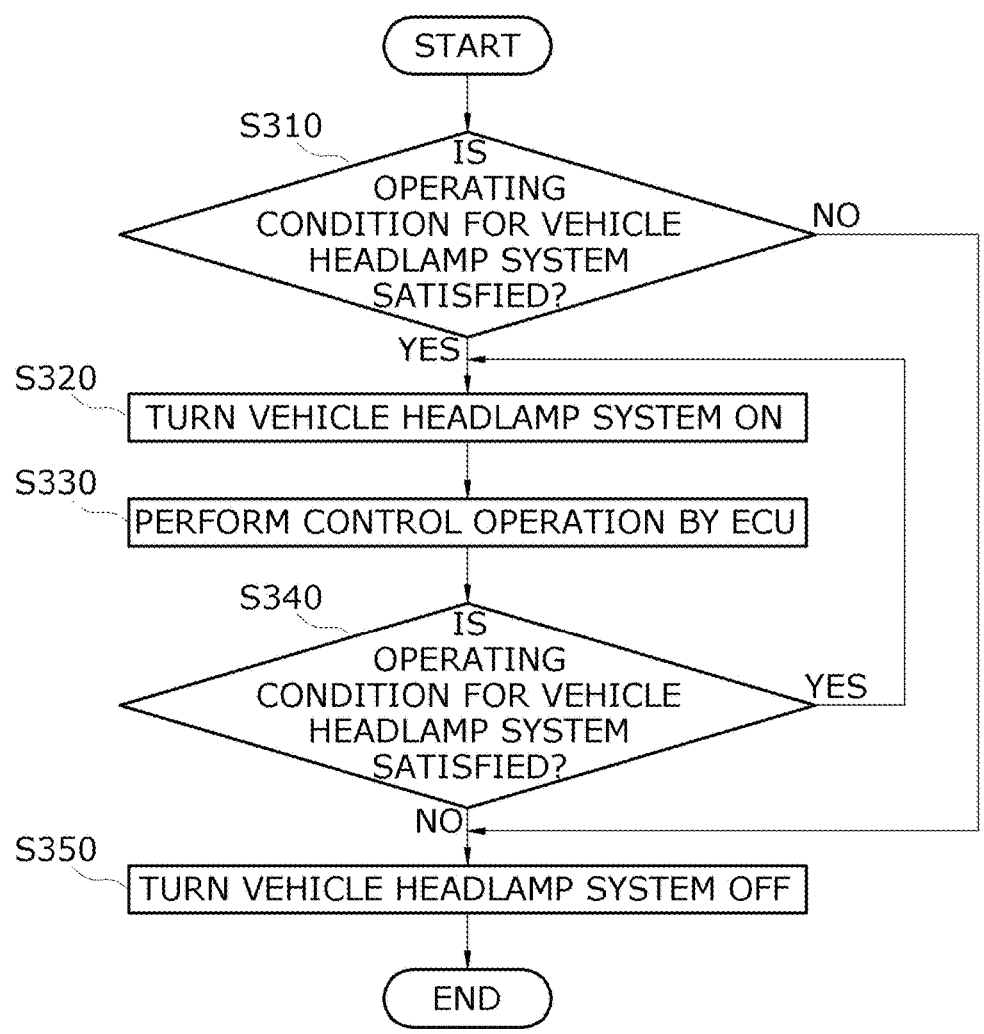

FIGS. 3A to 3C are flow charts illustrating a control method according to exemplary embodiments.

The method of controlling the vehicle headlamp system 100 providing glare-free high beams, according to exemplary embodiments, includes: determining whether or not the operating condition of the vehicle headlamp system 100 is satisfied in S310; when the operating condition is satisfied, turning the vehicle headlamp system 100 on in S320; and when the operating condition is not satisfied, turning the vehicle headlamp system 100 off in S350.

Since the headlamp system 100 according to exemplary embodiments may be used in an autonomous vehicle, the step of determining whether or not the operating condition is satisfied may be included.

The operating condition of the vehicle headlamp system 100 may be, for example, a preset time, a preset level of luminous intensity, a date. For example, the vehicle headlamp system 100 may be controlled to be automatically turned on after 5 PM or to be turned on, even in daytime, when luminous intensity is low due to rain or cloudy weather.

When the vehicle headlamp system 100 is turned on as described above, a control operation is performed by the ECU 140 in S330. After the control operation is performed, it is determined again as to whether or not the operating condition is satisfied in S340, so that the control operation can be continued or terminated according to the result of the determination.

When the vehicle headlamp system 100 is turned on, as illustrated in FIG. 3B, the ECU 140 receives a forward image captured using the camera and information regarding blind spots detected by the blind spot sensor 120 in S331, sets an illumination area to be lighted by the headlamps 160 based on the forward image and the information regarding blind spots in S333, and then drives the headlamps 160 by transferring a control command for controlling the set illumination area to the driving unit 150 in S335.

In the step S333 of setting the illumination area of the headlamps 160, as illustrated in FIG. 3C, the forward image and the information regarding detected blind spots are analyzed in S3331, and it is determined as to whether or not a preceding vehicle or a passing vehicle is present according to the result of the analysis in S3333.

When neither a preceding vehicle nor a passing vehicle is determined to be present according to the result of the analysis, the illumination area is set such that high beams are emitted in S3335.

In contrast, when a right or left passing vehicle is determined to be present, the illumination area may be set such that high beams, currently being emitted, are converted into low beams.

Afterwards, in S3337, the entirety or a portion of the headlamps 160 can be turned off so that a right or left portion of the illumination area, corresponding to the passing vehicle, is reduced.

In addition, even in a case in which a passing vehicle is not present, when a preceding vehicle is determined to be present within a preset distance, the operation may be controlled to convert high beams into low beams.

The steps S310 to S350, as described above, may further be divided into additional steps or combined to form a smaller number of steps, depending on implementations of the present disclosure. In addition, some steps may be omitted as required, or the sequence of some steps may be changed. Furthermore, the features described above with reference to FIGS. 1 and 2 are applicable to the control method illustrated in FIGS. 3A to 3C, even if repeated descriptions thereof are omitted.

According to one of the foregoing exemplary embodiments, the headlamp system can be applied as a vehicle headlamp system, which is currently used in a mass production vehicle model, without an increase in fabrication costs, or as an autonomous driving sensor.

In addition, even in the case in which a passing vehicle is present, glare to a preceding vehicle or an oncoming vehicle can be prevented, so that a decrease in glare to an oncoming driver can reduce traffic accidents.

Exemplary embodiments may be implemented as a computer executable program or a computer readable record medium containing therein computer executable instructions. The computer readable record medium may be any available medium that is computer accessible, and includes all of volatile and nonvolatile media and separated and unseparated media. In addition, computer readable record medium may include all of computer storage media and communication media. The computer storage media include all of volatile, nonvolatile, separated and unseparated media, which are realized by any methods or technologies for storing information, such as computer readable instructions, data structures, program modules, or other data. Typically, the communication media include computer readable instructions, data structures, program modules, other data of modulated data signals, such as carrier waves, or other transmission mechanisms, and include any information transfer media.

Although the method and system of the present disclosure have been described in connection with the specific embodiments, some or all of the components or operations thereof may be realized using a computer system having general-use hardware architecture.

The foregoing description of the present disclosure has been provided for illustrative purposes, a person skilled in the art will appreciate that other specific modifications can be easily made without departing from the technical spirit or essential features of the present disclosure. Therefore, the foregoing embodiments shall be interpreted as illustrative, while not being limiting, in all aspects. For example, some components, each of which has been described as being a single form, can be implemented in the distributed form, whereas other components, which have been described as being distributed, can be implemented in a combined form.

The scope of the present disclosure is not defined by the detailed description as set forth above but by the appended Claims. It should also be understood that all changes or modifications derived from the definitions and scopes of the Claims and their equivalents fall within the scope of the present disclosure.

What is claimed is:

1. A vehicle headlamp system, comprising:
    a forward image-capturing device configured to capture a forward image ahead of a vehicle in which the headlamp system is provided;
    a radar sensor configured to detect an object ahead of the vehicle;
    a blind spot sensor configured to detect blind spots to side and rear of the vehicle;
    a headlamp configured to light ahead of the vehicle based on a set illumination area;
    an electronic control unit configured to generate a control command for controlling an illumination area of the headlamp, based on the forward image captured by the forward image-capturing device and information regarding the blind spots detected by the blind spot sensor; and
    a driving unit configured to operate the headlamp based on the control command received from the electronic control unit,
    wherein the headlamp comprises an adaptive driving beam headlamp configured to emit a high beam or a low beam, depending on the set illumination area,
    wherein, when neither a preceding vehicle nor a passing vehicle is determined to be present according to a result of analyzing the forward image and the information regarding the blind spots, the electronic control unit is configured to cause the high beam to be emitted,
    wherein, in a case in which a preceding vehicle is present, the electronic control unit is configured to cause the high beam to be emitted when the preceding vehicle is determined to be present based on radar information obtained by the radar sensor but not to be present in the forward image, and further configured to cause the low beam to be emitted when the preceding vehicle is determined to be present based on the radar information and the forward image.

2. The vehicle headlamp system according to claim 1, wherein the electronic control unit is configured to cause the high beam to be turned off and the low beam to be turned on, when a right or left passing vehicle is present according to a result of analyzing the forward image and the information regarding the detected blind spots.

3. The vehicle headlamp system according to claim 2, wherein the electronic control unit is configured to cause a portion of the headlamp to be turned off so that a right or left portion of the illumination area, corresponding to the passing vehicle, is reduced.

* * * * *